US007643457B2

(12) United States Patent
Pinault

(10) Patent No.: US 7,643,457 B2
(45) Date of Patent: Jan. 5, 2010

(54) WIRELESS COMMUNICATIONS NETWORK WITH RADIO ACCESS POINTS WITH DYNAMICALLY ADAPTABLE TRANSMISSION POWER LEVEL

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 277 days.

(21) Appl. No.: 10/964,766

(22) Filed: Oct. 15, 2004

(65) Prior Publication Data

US 2005/0083895 A1 Apr. 21, 2005

(30) Foreign Application Priority Data

Oct. 17, 2003 (FR) .................................. 03 12134

(51) Int. Cl.
*H04W 4/00* (2009.01)
*H04B 7/00* (2006.01)

(52) U.S. Cl. ..................... 370/338; 455/522; 455/456.1

(58) Field of Classification Search .............. 455/452.2, 455/453, 440, 436, 522, 456.1; 370/328, 370/338
See application file for complete search history.

(56) References Cited

U.S. PATENT DOCUMENTS 5,276,907 A * 1/1994 Meidan ....................... 455/436

| 2002/0085719 | A1 | 7/2002 | Crosbie |
| 2002/0142773 | A1* | 10/2002 | Rudrapatna et al. ......... 455/440 |
| 2002/0173316 | A1 | 11/2002 | Jang et al. |
| 2003/0163579 | A1 | 8/2003 | Dharmadhikari et al. |
| 2003/0207683 | A1* | 11/2003 | Lempio et al. ........... 455/456.1 |
| 2004/0072565 | A1* | 4/2004 | Nobukiyo et al. ........... 455/436 |

FOREIGN PATENT DOCUMENTS

EP 0615395 B1 9/1994
EP 1 058 474 A 12/2000

OTHER PUBLICATIONS

"Spectrum re-use in a wireless Lan" Research Disclosure, Kenneth Mason Publications, Hampshire, GB, vol. 337, No. 101. May 1992.
EPO Search Report dated Aug. 24, 2009.

* cited by examiner

*Primary Examiner*—Quochien B Vuong
(74) *Attorney, Agent, or Firm*—Sughrue Mion, PLLC

(57) ABSTRACT

A management device (D) for radio access points (AP), of a wireless communications network (WLAN), comprises processing means (PM) responsible for dynamically determining the transmission power level of each access point (AP) that it manages depending on the presence and/or respective locations of communication terminals (UEj) in relation to the said access points and to at least one criterion selected, so that said access points establish said levels.

Figure 1:
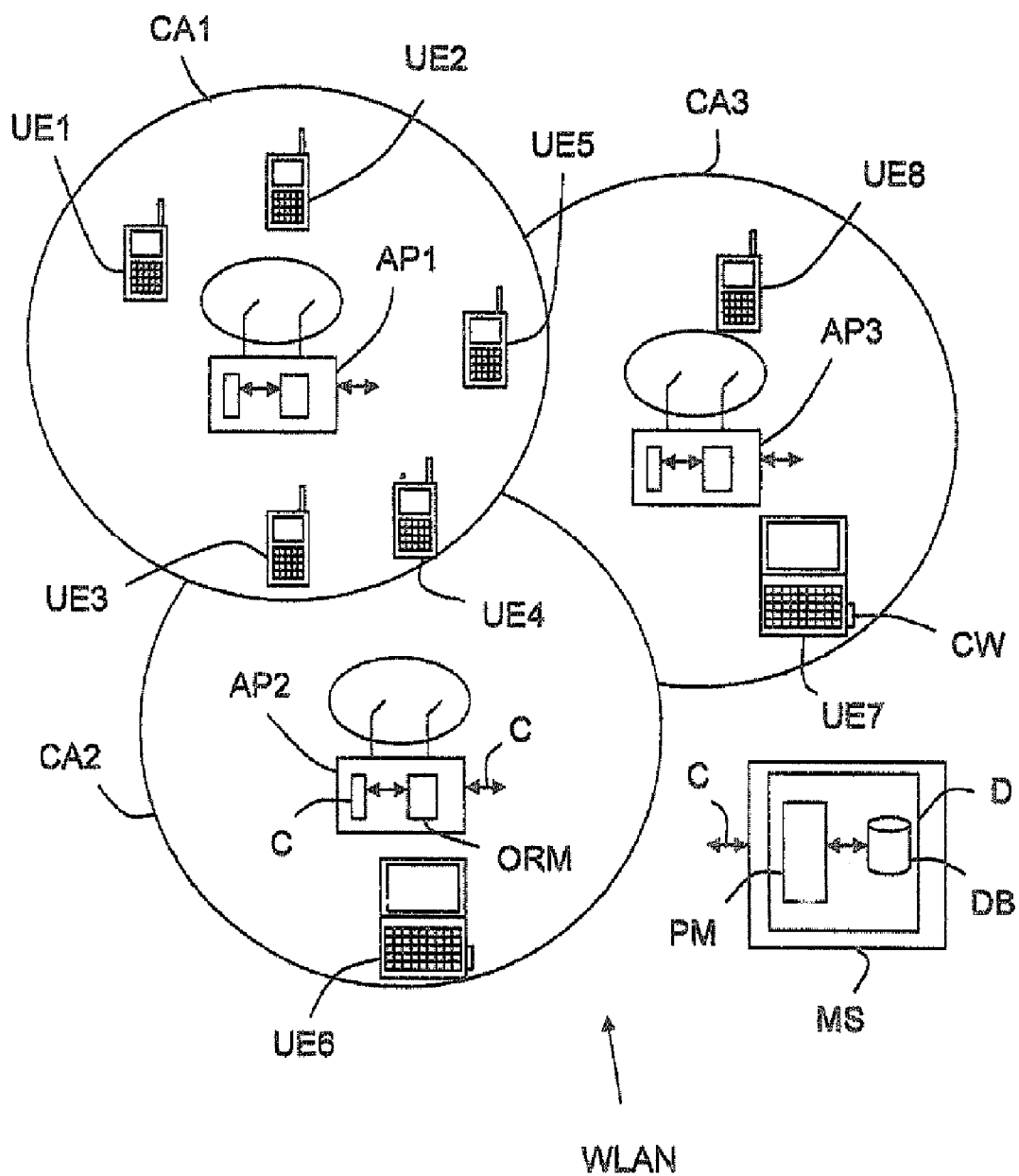

14 Claims, 2 Drawing Sheets

WIRELESS COMMUNICATIONS NETWORK WITH RADIO ACCESS POINTS WITH DYNAMICALLY ADAPTABLE TRANSMISSION POWER LEVEL The invention relates to the field of wireless communications networks.

Certain wireless communications networks comprise a plurality of access points to which communication terminals suitable for this purpose may be connected. In said type of network, each network access point has, on one hand, a transmission power which defines a coverage area in which it may exchange data with communication terminals, and on the other hand, resources which define the maximum traffic that it may accept. Generally, the access points resources are oversized so that they can support exceptional loads.

When too many terminals are connected to the same access point, often the level of quality of service (or QoS) offered by the network, via said access point, is either significantly inferior to that which is owed to users of the connected terminals, while other network access points are underloaded. In other words, in current wireless networks it is not possible to carry out dynamic load balancing.

The purpose of the invention, thus, is to resolve said inconvenience.

For this, it proposes a device dedicated to the management of radio access points of a wireless communications network, and comprising processing means responsible for dynamically determining the transmission power level of each access point depending on the presence and/or respective locations of communication terminals in relation to said access points, and at least one selected criteria, so that said access points establish said levels.

For example, the criterion selected is a comparison with a first threshold representative of the maximum number of communication terminals that may be connected to a network access point. In this case, the processing means are responsible for comparing the number of communication terminals connected to each network access point with the first threshold, then determining the transmission power level of each access point depending, at least, on the result of the comparison that concerns it. In the variant, the processing means may be designed so as to determine the transmission power level of each access point depending on all of the comparisons carried out for each access point and the information data representative of the network topology.

In the variant or complement, the criterion selected may be a comparison with a second threshold representative of the maximum traffic that each network access point may be able to support. In this case, the processing means are responsible for comparing the current traffic at the level of each network access point with the second threshold, then determining the transmission power level of each access point depending, at least, on the result of the comparison that concerns it. In the variant, the processing means may be designed so as to determine the transmission power level of each access point depending on all of the comparisons carried out for each access point and the information data representative of a network traffic model.

The management device may also comprise memory means responsible for storing information data useful for the determinations carried out by its processing means.

The invention also proposes a management device for radio access points of a wireless communications network equipped with a management device like the one presented above.

In addition, the invention proposes a radio access point for a wireless communications network comprising transmission means and control means responsible for adapting the power level of the transmission means depending on the instructions received from a management device like the one presented above.

The invention is particularly well suited, although in a non-exclusive way, to wireless communications networks designed in the form of local area networks (or WLAN for "Wireless Local Area Network"), and to cellular networks, for example of the GSM or UMTS type.

Figure 2:
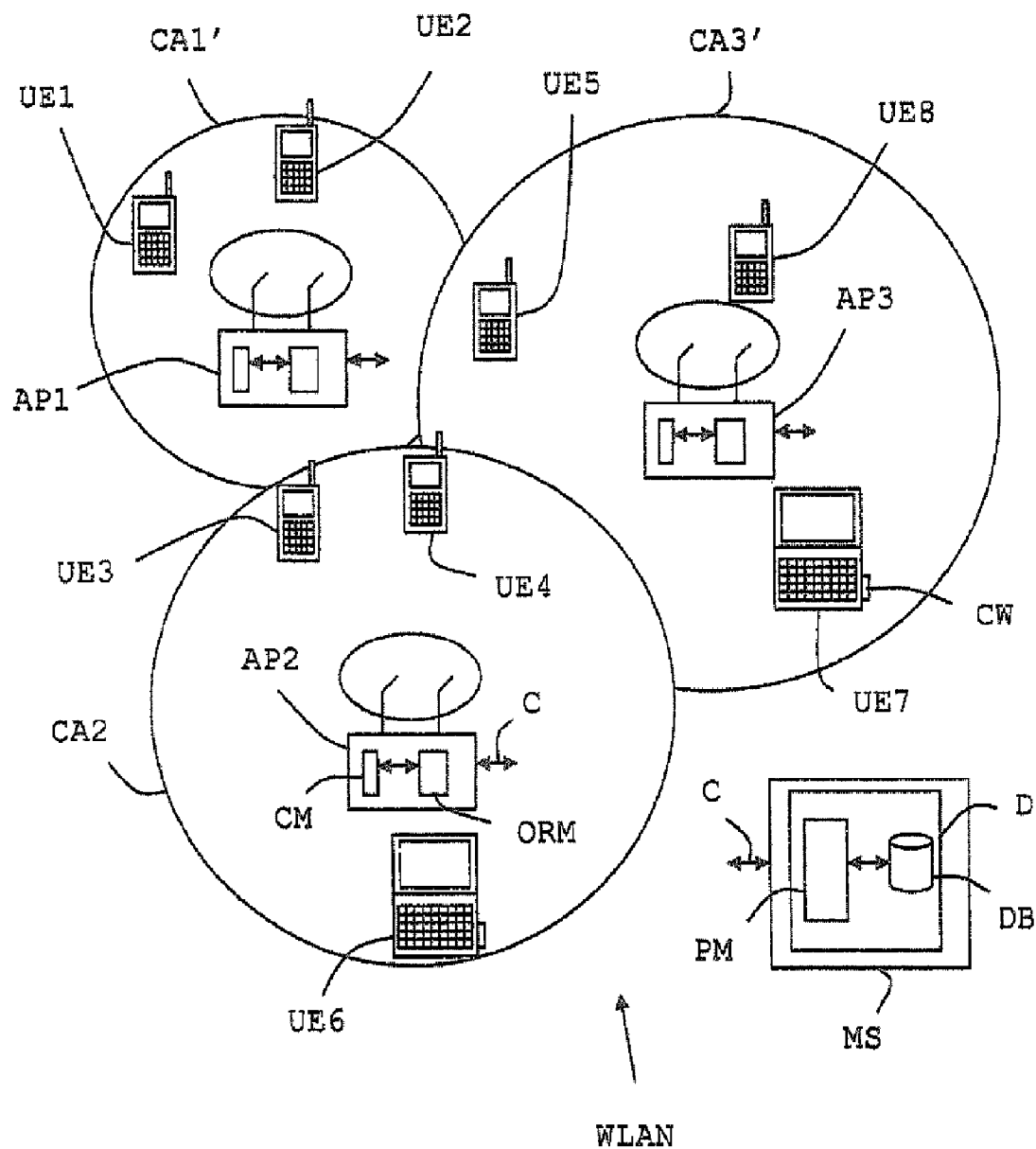

Other characteristics and advantages of the invention will appear on examination of the description detailed hereafter, and of the appended drawings, in which:

FIG. 1 schematically illustrates an example of embodiment of a wireless local area network equipped with access points as per the invention placed in first configurations, and FIG. 2 schematically illustrates an example of embodiment of a wireless local area network equipped with a management server as per the invention and with access points as per the invention placed in second configurations.

The appended drawings may not only be used to complement the invention, but may also contribute to its definition, if necessary.

The purpose of the invention is to enable the load of the access points with a wireless communications network to be managed.

The wireless communications network WLAN illustrated in FIGS. 1 and 2 consists of radio access points APi (here i=1 to 3, but it may take any value higher or equal to 2) enabling suitable wireless communication terminals UEj (here j=1 to 8, but it may take any value), which are located in their respective coverage areas CAi, to be connected to said network.

Here, "wireless communication terminal" (hereafter UE terminal) means, any communication equipment equipped with a removable or integrated WLAN card CW capable, here, of accessing a WLAN network when it is located in one of its coverage areas CAi. Consequently, a UE terminal is, for example, a cell phone, a portable microcomputer (or laptop), or a personal digital assistant (PDA).

Here, the WLAN wireless network is a Wireless Local Area Network belonging, for example, to a group of businesses. However, in variants, it may be of the Bluetooth or UWB (for "Ultra Wide Band") type. It may also concern a non-local area network, for example, of the UMTS, EDGE or GSM type.

Although not represented, such a network may possibly be connected by at least one of its access points APi to an edge router, itself connected to one or more public telephone networks and/or to one or more public data networks, as for example, an Internet protocol (or IP) network. Such an edge router assures the call server function, that is, it is responsible for establishing links between the terminals UEj, which are located in one of the WLAN network coverage areas CAi and which therefore are likely to being connected by wave channel to its access points APi, and public telephone and/or data networks PDN.

As per the invention, each access point APi has, on one hand, an output/reception module ORM, assuring the links with the terminals UEj which are located in its coverage area CAi, and the transmission power level of which may be adjusted dynamically, and on the other hand, a control module CM responsible for adjusting said level depending on the instructions received from the WLAN network.

Said instructions are formulated by a management device D, which here is installed in a WLAN network management server MS, coupled with the access points APi, by wave channel or, as illustrated, by cable-controlled channel C.

More precisely, the management device D comprises a processing module PM responsible for determining the transmission power level of each access point APi depending on the presence and/or the respective locations of communication terminals UEj in relation to said access points APi and at least one criterion selected.

The transmission power level of an access point APi determines the size of its coverage area CAi in a free field type of application for the transmission of radio waves. Said size may be weighted by propagation characteristics specific to the places where the access points are located, as for example, in airports or business premises (or offices).

At least two criteria may be envisaged. As per the configuration of the processing module PM, said criteria may be used separately or combined.

For example, the criterion selected may be a comparison with a first threshold S1 representative of the maximum number of terminals UEj which may be connected to a network access point APi.

The criteria selected may also be a comparison with a second threshold S2 representative of the maximum traffic that each network access point APi may support without this affecting the quality of service (or QoS). "Current traffic" means the rate of resource usage of the access point considered, dedicated at a given moment to connections between the terminals UEj and the WLAN network.

More complex criteria may also be envisaged. Indeed, the transmission power level of each access point APi may be determined depending, on one hand, on all of the threshold comparisons (S1 and/or S2) carried out for each access point APi, and on the other hand, information data representative of the network topology and/or a network traffic model. Said information data is preferentially stored in a management device D database DB, connected to the processing module PM. They contain, for example, propagation coefficients linked to the buildings, the types of traffic commonly used in the company and their respective consumptions in terms of bandwidth.

In order to assure its dynamic determination of the levels, the processing module PM is supplied with information representative of the number of terminals UEj connected to each access point APi of the WLAN network and/or of the current traffic at the level of each of the said access points. Said information may be automatically transmitted, for example, periodically by the terminals UEj, or even on request of the processing module PM.

For example, the processing module PM is responsible for comparing the number of connections established with the terminals UEj by each access point APi with the first threshold S1. It is important to note that the access points AP may have different capabilities, so that they can be associated to the first comparison thresholds of different values. For example, when the processing module PM detects that one of the access points APi is connected to a higher number of terminals UEj than the first corresponding threshold S1, it analyses the comparison results concerning the other access points APi' so as to determine if at least one of them is capable of assuring (or supporting) some connections of the overloaded access APi by possibly increasing the size of its coverage area CAi'.

If the access point APi' can support one or some of the additional connections, and of course if the terminals UEj causing the overloading of the access point APi are located in the vicinity of the first coverage area CAi' of the access point APi', then the processing module PM determines, on one hand, the new necessary and sufficient level of power to the access point APi' to assure the access point APi connection(s), and on the other hand, the new necessary and sufficient level of power to the access point APi to assure its remaining connections.

Here, it is reminded that local or public, standardized cellular networks provide protocols enabling the establishment of what is commonly named "handovers" for voice or data traffic. The characteristics of said protocols enable it to be known, generally depending on the type of network, which equipment is "seen" by each base station or access point of said networks. Consequently, for a processing module PM to be able to determine if terminals UE are located in the vicinity of a coverage area CA other than the one where they are located, it only has to use its knowledge of the network topology processed and/or the information transmitted by the network equipment.

In FIGS. 1 and 2, two examples of WLAN network configuration are shown corresponding to situations before and after the level adjustment. Here, by way of example, it is considered that the maximum number of connections that the network access points APi may support (that is S1) is equal to four, and the number of power levels that the network access points APi can apply is equal to three. The first level corresponds, for example, to the lowest level and thus to the smaller coverage area CA.

In the case of FIG. 1, the processing module PM knows, firstly, that the first access point AP1 is connected to five terminals UE1 to UE5 and that its current power level is the second, secondly, that the second access point AP2 is connected to a single terminal UE6 and that its current power level is the second, and thirdly, that the third access point AP3 is connected to two terminals UE7 and UE8 and that its current power level is the second. Furthermore, the processing module PM knows, on one hand, that terminals UE3 and UE4 are located in the coverage area CA2 of the second access point AP2, and on the other hand, that terminal UE5 is located in the coverage area CA3 of the third access point AP3.

The processing module PM deducts from said information, firstly, that there is no point in increasing the power level of the first access point AP1 given that it is already in connection overload, secondly, that the second access point AP2 may support the connections of the two terminals UE3 and UE4 without it being necessary to increase the power level, and thirdly, that the third access point AP3 may support the connection of terminal UE5 on condition that it increases its power level. Furthermore, the processing module PM deduces from the information that, due to the location of terminals UE1 and UE2, the first access point AP1 may reduce its transmission power by one level.

The processing module PM therefore generates instructions ordering, on the one hand, the first access point AP1 to pass from power level number two to power level number one, and on the other hand, the third access point AP3 to pass from power level number two to power level number three.

On receiving their respective instructions, the first AP1 and third AP3 access points transmit them to their control module CM which consequentially configures the output/reception module ORM to which it is connected. The first access point AP1 therefore has, as illustrated in FIG. 2, a new coverage area CA1' (smaller than the previous CA1), the second access point AP1 has a coverage area CA2 identical to the previous one, and the third access point AP3 has a new coverage area CA3' (larger than the previous CA3).

Of course, many other situations may be envisaged, possibly taking into account a criterion other than the first S1, for example the second S2, or even both the first S1 and second S2 criteria.

Thus, a situation may be envisaged where the second access point AP2 is capable of supporting, in terms of number, two additional connections with the two terminals UE3 and UE4, but does not have enough available resources to assure said two additional connections. For example, it may support the connection with terminal UE4. In this case, the processing module PM decides, on one hand, to maintain the respective levels of the first AP1 and second AP2 access points, so that the first AP1 continues to assure the connections with terminals UE1, UE2 and UE3 and that the second AP2 assures the connections with terminals UE4 and UE6, and on the other hand, to increase the power of the third access point AP3 so that it assures the connections with terminals UE5, UE7 and UE8.

The management device D may be designed so as to transmit statistical traffic information to a network management application responsible for signaling to the network manager that it is necessary to optimize the capacity of its network by adding or by removing an access point in a particular area.

Furthermore, the management device D may be designed so as to generate alarms to a network administration module in the event of traffic saturation.

In addition, the management module D may be designed, in the event of detected traffic saturation and an incapacity to regulate said traffic, so as to order the restriction of the network access, via an access point, to certain priority equipment designated in a priority equipment list stored in a memory.

The management device D as per the invention, and namely its processing module PM, and the control modules CM may be constructed in the form of electronic circuits, software (or computer) modules, or a combination of circuits and software.

Thanks to the invention, it is now possible to maintain the quality of service within a wireless communications network almost constantly. In addition, as the power level of each access point can be dynamically managed, on one hand, load balancing can be carried out permanently, and on the other hand, it is no longer necessary to oversize the wireless communications network capacities so that they support exceptional situations.

The invention is not limited to embodiments of management device D, management server MS and access point AP previously described, only by way of example, but it may include all the variants that the person skilled in the art may consider within the scope of the claims hereafter.

Thus, as aforementioned a wireless communications network comprising a management server responsible for centrally managing all of the network access points has been described. However, it may be envisaged that the network be subdivided into subsets, each one having a management server.

The invention claimed is:

1. A management device for radio access points of a wireless communications network, comprising:
   a processing module which dynamically determines a new transmission power level of each access point based on at least one of the presence and the respective locations of communication terminals in relation to said access points;
   wherein said processing module
     performs at least one comparison of a first comparison of the number of communication terminals connected to each access point on the network with a first threshold representing a maximum number of communication terminals that each access point is capable of being connected to, and a second comparison of a current traffic level of each access point on the network with a second threshold representing a maximum traffic level that each access point is capable of supporting; and
     determines the new transmission power level of each access point based on the respective locations of said communication terminals in relation to said access points and whether at least one of said thresholds is exceeded in said at least one comparison carried out for the corresponding access point.

2. A device as set forth in claim 1, wherein said processing module determines the new transmission power level of each access point based on the respective locations of said communication terminals in relation to said access points, the first and second comparisons carried out for each access point, and representative information of a network topology of said wireless communications network.

3. A device as set forth in claim 2, further comprising a storage module which stores said information data.

4. A device as set forth in claim 1, wherein said processing module determines the new transmission power level of each access point based on the respective locations of said communication terminals in relation to said access points, the first and second comparisons carried out for each access point, and representative information data of a model of traffic of said wireless communications network.

5. A device as set forth in claim 1, wherein the device generates alarms to a network administration module in the event of traffic saturation.

6. A device as set forth in claim 1, wherein the device, in the event of detecting traffic saturation and an incapacity to regulate said traffic, orders the restriction of network access, via an access point, to priority equipment selected in a list of priority equipment.

7. The device of claim 1, wherein said processing module generates instructions which cause said access points to transit at the transmission power level.

8. A radio access point for a wireless communications network, comprising:
   a communication module; and
   a control module which adapts the level of power of the communication module based on instructions received from a management device for radio access points of a wireless communications network; and
   wherein the management device for radio access points of a wireless communications network dynamically determines a new transmission power level of the communication module based on at least one of the presence and the respective locations of communication terminals in relation to said access point;
   wherein said management device
     performs at least one comparison of a first comparison of the number of communication terminals connected to each access point on the network with a first threshold representing a maximum number of communication terminals that each access point is capable of being connected to, a second comparison of a current traffic level of each access point on the network with a second threshold representing a maximum traffic level that each access point is capable of supporting; and
     determines a new transmission power level of each access point depending on the respective locations of said communication terminals in relation to said access points and whether at least one of said thresholds is exceeded in said at least one comparison carried out for the corresponding access point.

9. The radio access point of claim 8, wherein said management device generates instructions which cause said access points to transmit at the new transmission power level.

10. A method for managing radio access points of a wireless communications network, the method comprising:

performing at least one comparison of a first comparison of a number of communication terminals connected to each access point on the network with a first threshold representing a maximum number of communication terminals that each access point is capable of being connected to, and a second comparison of a current traffic level of each access point on the network with a second threshold representing a maximum traffic level that each access point is capable of supporting;

determining a new transmission power level of each access point based on the locations of said communication terminals in relation to said access points and whether at least one of said thresholds is exceeded in said at least one comparison carried out for each of said access points; and instructing said access points to adjust to said new transmission power level.

11. The method of claim 10, wherein said determining a new transmission power level is further based on propagation characteristics specific to the respective locations of said access points.

12. The method of claim 11, wherein said propagation characteristics are represented by propagation coefficients for the locations of said access points, the propagation coefficients being linked to at least one of the group consisting of the buildings, the types of traffic commonly used, and the bandwidth consumption of the types of traffic commonly used.

13. The method of claim 10, wherein:

if said first comparison for a first access point indicates that the number of communication terminals connected to the first access point is higher than said threshold, determining based on said first comparison for each of the other access points whether there exists a second access point, located in the vicinity of a coverage area of the first access point, capable of supporting connections to one or more of the communication terminals connected to the first access point; and if said second access point exists, determining a new transmission power level for said first access point, and a new power level for said second access point, so as to allow a handover of one or more of the communication terminals connected to the first access point to the second access point, and allow said first access point to assure its remaining connections.

14. The method of claim 10, further comprising generating instructions which cause said access points to transmit at the new transmission power level.

* * * * *

UNITED STATES PATENT AND TRADEMARK OFFICE
CERTIFICATE OF CORRECTION

PATENT NO. : 7,643,457 B2  Page 1 of 1
APPLICATION NO. : 10/964766
DATED : January 5, 2010
INVENTOR(S) : Francis Pinault It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this

Twenty-first Day of December, 2010

David J. Kappos
*Director of the United States Patent and Trademark Office*